United States Patent
Matthews

(10) Patent No.: US 6,412,278 B1
(45) Date of Patent: Jul. 2, 2002

(54) HYDRAULICALLY POWERED EXHAUST GAS RECIRCULATION SYSTEM

(75) Inventor: Patrick Matthews, West Bloomfield, MI (US)

(73) Assignee: BorgWarner, Inc., Troy, MI (US)

( * ) Notice: Subject to any disclaimer, the term of this patent is extended or adjusted under 35 U.S.C. 154(b) by 0 days.

(21) Appl. No.: 09/709,706

(22) Filed: Nov. 10, 2000

(51) Int. Cl.⁷ ................................................ F02B 33/44
(52) U.S. Cl. ........................ 60/605.1; 60/607; 60/608; 60/612
(58) Field of Search .......................... 60/605.1, 605.2, 60/607, 612, 608

(56) References Cited

U.S. PATENT DOCUMENTS

| | | |
|---|---|---|
| 4,169,354 A | 10/1979 | Woollenweber |
| 4,285,200 A | 8/1981 | Byrne et al. |
| 4,630,444 A | 12/1986 | Schatz |
| 4,969,332 A * | 11/1990 | Nancarrow et al. ........... 60/608 |
| 5,346,364 A | 9/1994 | Kapich |
| 5,375,419 A | 12/1994 | Wright et al. |
| 5,406,796 A | 4/1995 | Kiereth et al. |
| 5,421,310 A | 6/1995 | Kapich |
| 5,471,965 A | 12/1995 | Kapich |
| 5,845,495 A * | 12/1998 | Schray et al. ................. 60/612 |
| 5,904,045 A * | 5/1999 | Kapich ..................... 60/612 X |
| 5,924,286 A | 7/1999 | Kapich |
| 5,937,832 A | 8/1999 | Kapich |
| 5,974,802 A | 11/1999 | Blake |
| 6,062,026 A * | 5/2000 | Woollenweber et al. ... 60/605.2 |
| 6,112,523 A * | 9/2000 | Kamo et al. .................. 60/612 |

* cited by examiner

*Primary Examiner*—Hoang Nguyen
(74) *Attorney, Agent, or Firm*—Pendorf & Cutliff; Greg Dziegielewski

(57) ABSTRACT

A hydraulically powered exhaust gas recirculation system for an internal combustion engine includes a hydraulically driven turbine (71) that powers a compressor (72). The compressor (72) pressurizes a portion of the exhaust gas from an internal combustion engine (10) and supplies it to a mixer (40). Another portion of the exhaust gas drives the turbine (21) of a turbocharger (20), which in turn powers a compressor (23) that delivers intake air to the mixer (40). The mixer (40) combines the air and the recirculated exhaust gas and delivers the mixture to the intake manifold (11) of the engine (10). The hydraulically powered turbine (71) may be driven by any of a number of systems, such as the power steering system of an automobile, high pressure oil from a diesel fuel injection system or an auxiliary hydraulic system. The flow of recirculated exhaust gas may be regulated in any number of manners, such as by controlling the pressure and displacement of the hydraulic pump (82) or by a valve (50).

20 Claims, 1 Drawing Sheet

HYDRAULICALLY POWERED EXHAUST GAS RECIRCULATION SYSTEM

BACKGROUND OF THE INVENTION

Figure 1:
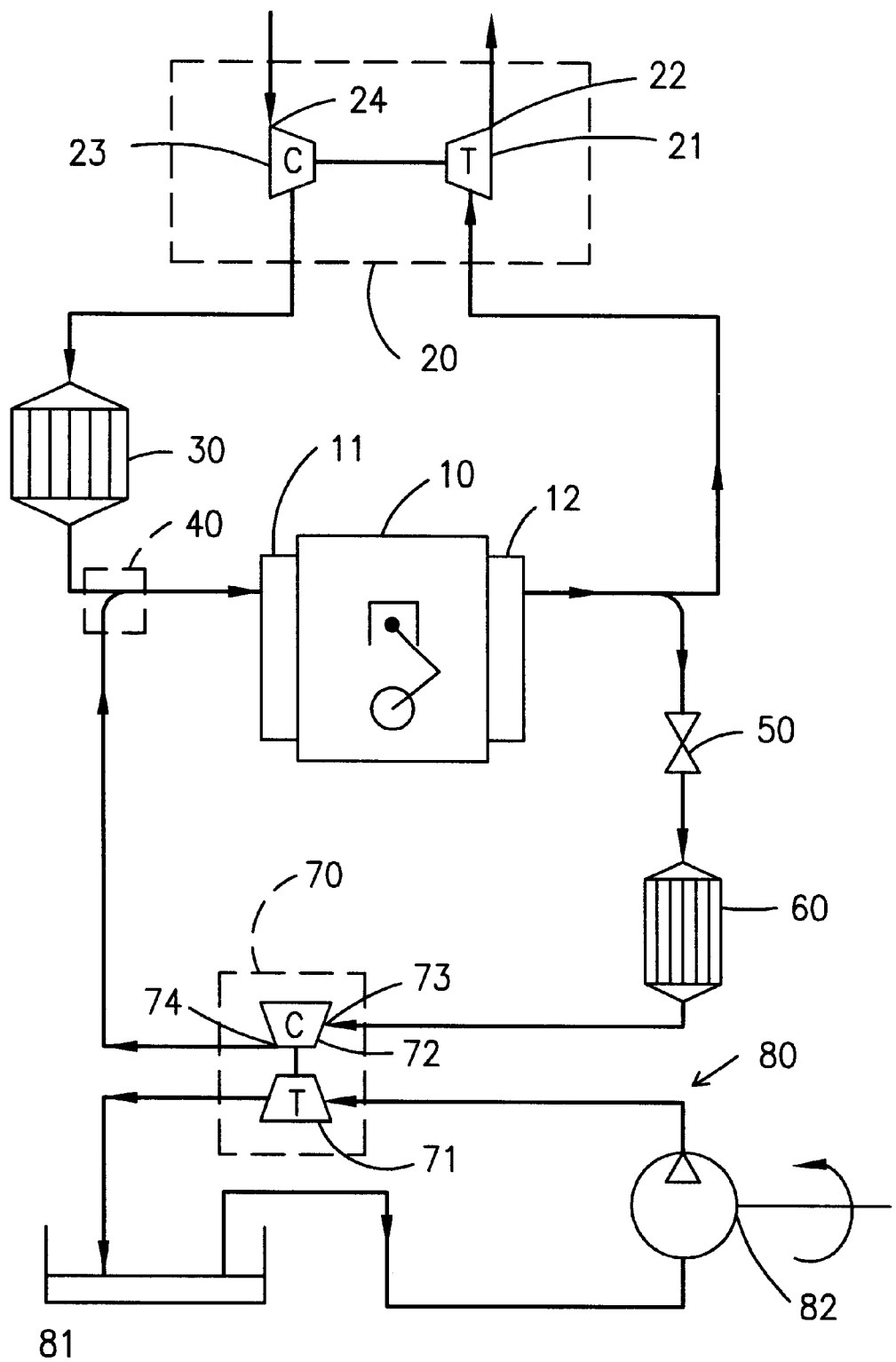

The present invention relates to hydraulically powered exhaust gas recirculation systems for internal combustion engines.

Various turbochargers and super chargers are known in the art. In one type of turbocharger, the exhaust gas from the internal combustion engine drives a turbine, which in turn drives a compressor. The compressor pressurizes intake air and feeds it into the intake manifold of the internal combustion engine.

Exhaust gas recirculation (EGR) systems are sometimes used in conjunction with turbochargers. In such a system, a portion of the exhaust gas from the internal combustion engine is recirculated from the exhaust manifold back to the intake manifold. This reduces emissions from the engine to the atmosphere. In one system shown in WO 98/39563, published Sep. 11, 1998, a portion of the exhaust gas drives a turbine, which in turn powers a compressor. The compressor rotor has two sets of vanes on opposite sides of the rotor disk. In operation, one set of vanes pressurizes fresh intake air and delivers it to the intake manifold of the engine. A portion of the exhaust is also fed into the compressor, where it is pressurized by the other set of vanes and delivered to the intake manifold of the engine.

Another exhaust gas recirculation system is shown in U.S. Pat. No. 5,974,802 to Blake. In that system, a portion of the exhaust drives a turbine that in turn powers a compressor. The compressor pressurizes intake air, ultimately delivering it to the intake manifold of the engine. Another portion of the exhaust is pressurized by a coanda pump and ultimately delivered to the intake manifold of the engine.

In exhaust gas recirculation systems, the pressure of the fresh intake air is greater than the pressure of the recirculated exhaust gas. Accordingly, it is necessary to increase the pressure of the recirculated exhaust gas so that it will flow freely into the internal combustion engine. Although it is possible to introduce the recirculated exhaust gas into the engine's fresh air inlet, exhaust gas can corrode components within the intake tract, such as the turbocharger compressor and the charge air cooler. It is possible to use throttling devices and venturi devices to lower the pressure in the intake tract to allow the recirculated exhaust gas to flow in the desired direction. However, the pressure losses associated with this technique create unacceptable energy losses in the engine. Thus, it is desirable to use a pump to raise the pressure of the recirculated exhaust gas such that flow into the intake tract is possible.

Obviously, it is necessary to provide an energy source to power the pump used to increase the pressure of the recirculated exhaust gas. Electric energy is impractical for this purpose. Various mechanical drive mechanisms are possible but have drawbacks. For example, slow speed compressors driven by the engine have many critical clearances which may be fouled by the exhaust gas. High speed centrifugal compressors require expensive drive systems to achieve the desired speeds. The exhaust gas itself can be utilized to drive a turbine, such as discussed above in conjunction with WO 98/39563. However, large amounts of power and high shaft speeds can be obtained by the use of hydraulic turbines in sizes smaller than the exhaust gas recirculation turbine of devices such as those shown in WO 98/39563. In an internal combustion engine, hydraulic power can be conveniently provided from either a dedicated pump driven by the engine or from an existing hydraulic source on the engine, such as power steering or fuel injection systems or an auxiliary hydraulic system.

SUMMARY OF THE INVENTION

The present invention is directed to a hydraulically powered exhaust gas recirculation system for an internal combustion engine. In one embodiment of the present invention, an exhaust gas recirculation system for a vehicle includes an internal combustion engine having an air inlet, a first turbine powering a first compressor, a second turbine powering a second compressor, and a hydraulic system. Exhaust from the engine drives the first turbine while the hydraulic system drives the second turbine. The first compressor delivers air to the engine inlet and the second compressor delivers exhaust from the engine to the inlet. The hydraulic system may include a power steering system, oil from a fuel injection system, a dedicated hydraulic pump or other devices. The system may also include coolers for cooling the air before it enters the engine inlet and the exhaust gas before it enters the second compressor. A mixer may be utilized to combine the air from the first compressor and the exhaust from the second compressor. The flow of exhaust to the engine may be regulated by any number of means, such as by a valve or through control of the hydraulic system.

It is an object of the present invention to provide an improved exhaust gas recirculation system for an internal combustion engine.

It is another object of the present invention to provide a hydraulically powered exhaust gas recirculation system for an internal combustion engine.

Other features of the present invention will be apparent to those skilled in the art from the following description and accompanying drawing.

DETAILED DESCRIPTION OF EMBODIMENTS OF THE INVENTION

Although the present invention is shown and described in detail below, the same is for purposes of example only and is not intended to limit the scope of the invention. Numerous changes and variations to the disclosed embodiments will be readily apparent to those skilled in the art without departing from the invention. Accordingly, the scope of the present invention is to be limited only by the terms of the claims.

FIG. 1 is a schematic diagram illustrating a hydraulically powered exhaust gas recirculation system for an internal combustion engine according to one embodiment of the present invention. In the embodiment shown in FIG. 1, the system includes an internal combustion engine 10, a turbocharger 20, a charge air cooler 30, a mixer 40, an EGR valve 50, an EGR cooler 60, an EGR pump 70 and a hydraulic system 80.

Engine 10 includes an intake manifold 11 and an exhaust manifold 12. Turbocharger 20 includes a turbine 21 having an exhaust outlet 22 and a compressor 23 having a fresh air intake 24. Turbocharger 20, charge air cooler 30, mixer 40, EGR valve 50 and EGR cooler 60 can all be any of a number of conventional components known in the art. For example, mixer 40 can be a simple T-connector. EGR pump 70 includes a turbine 71 and a compressor 72 having an inlet 73 and an outlet 74. Hydraulic system 80 includes a hydraulic fluid source 81 and a hydraulic pump 82.

In use, a portion of the exhaust from engine 10 flows from exhaust manifold 11 to turbine 21 of turbocharger 20. The exhaust gas drives turbine 21 and is then exhausted to the atmosphere through exhaust outlet 22. Turbine 21 powers compressor 23, which draws intake air in through inlet 24 and supplies it to charge air cooler 30. The air then flows through mixer 40 and into intake manifold 11.

A second portion of the exhaust gas from manifold 12 flows through EGR valve 50 and into EGR cooler 60. EGR valve 50 controls the flow of exhaust gas to EGR cooler 60. To this point, the exhaust gas system can be of known traditional designs. The present invention contemplates the introduction of the EGR pump 70 into the EGR system. The exhaust gas flows from EGR cooler 60 to compressor 72 of EGR pump 70. Compressor 72 is powered by turbine 71. Compressor 72 pressurizes the exhaust gas and feeds it to mixer 40, where it is mixed with the charged air from cooler 30 and fed to the intake manifold 11.

In accordance with one aspect of this invention, turbine 71 is driven by hydraulic system 80. Pump 82 delivers pressurized liquid to turbine 71 and recirculates the liquid back to source 81. Turbine 71 can be driven by any number of hydraulic systems 80. For example, an auxiliary hydraulic system dedicated to turbine 71 can be used. Alternatively, a power steering system or high pressure oil used in diesel fuel injection systems can be utilized. Other hydraulic systems for driving compressor 71 may also be used. The speed of turbine 71 is related to the rate of fluid flow in system 80. With such a hydraulically driven system, large amounts of power and high shaft speed can be obtained in a relatively small unit. Such a system also has the advantage of being able to utilize existing engine systems for power.

The flow of exhaust gas into intake manifold 11 can be regulated by any of a number of components of the system. For example, flow may be regulated by adjusting the EGR valve 50 so as to increase or decrease the amount of exhaust flowing to EGR cooler 60. Control of the EGR valve 50 can occur by a wide range of known mechanisms. Flow of the recirculated exhaust gas through the pump 70 may also be regulated by adjusting the shaft speed and/or displacement of the hydraulic pump 82. Again, this control can be accomplished in a number of known ways. Control can also be achieved by controlling the pressure and/or flow of hydraulic fluid within the system 80.

These components may in turn be controlled by a variety of control devices. For example, electromechanical feedback devices, computer controllers (including the engine's electronic controls or a separate stand-alone controller) and other systems that utilize measured inputs such as pressures, temperatures, exhaust gas composition and pump and engine speeds can be used. Other methods of regulating the flow of exhaust gas into manifold 11 may also be used.

What is claimed is:

1. An exhaust gas recirculation system for a vehicle, including an internal combustion engine (10) having an air inlet (11), a first turbine (21) driven by exhaust from the engine (10), a first compressor (23) for delivering air to the inlet (11), the first compressor (23) being powered by the first turbine (21), a second compressor (72) for delivering exhaust from the engine (10) to the inlet (11) and a second turbine (71) for powering the second compressor (72), characterized by a hydraulic system (80) for driving the second turbine (71).

2. An exhaust gas recirculation system according to claim 1, further characterized in that the hydraulic system (80) includes a source of pressurized liquid.

3. An exhaust gas recirculation system according to claim 1, further characterized in that the hydraulic system (80) is a power steering system.

4. An exhaust gas recirculation system according to claim 1, further characterized in that the hydraulic system (80) utilizes oil from a fuel injection system.

5. An exhaust gas recirculation system according to any of claims 1–4, further characterized by a mixer (40) for combining the air from the first compressor (23) and the exhaust from the second compressor (72).

6. An exhaust gas recirculation system according to any of claims 1–4, further characterized by means (50) for controlling the flow of exhaust to the second compressor (72).

7. An exhaust gas recirculation system according to any of claims 1–4, further characterized by means (50, 80) for regulating the flow of exhaust into the inlet (11).

8. An exhaust gas recirculation system according to claim 7, further characterized in that the means for regulating the flow of exhaust into the inlet (11) includes the hydraulic system (80).

9. An exhaust gas recirculation system according to claim 8, further characterized in that the hydraulic system (80) includes a pump (82) and the flow of exhaust into the inlet (11) is regulated by the pump (82).

10. An exhaust gas recirculation system according to claim 8, further characterized in that the flow of exhaust into the inlet (11) is regulated by the flow of hydraulic fluid through the hydraulic system (80).

11. An exhaust gas recirculation system according to any of claims 1–4, further characterized by a cooler (30) for cooling the air from the first compressor (23) before it enters the inlet (11) and a cooler (60) for cooling the exhaust before it enters the second compressor (72).

12. An exhaust gas recirculation system for a vehicle, comprising:

an internal combustion engine having an air inlet, and an exhaust outlet;

a first compressor assembly for delivering air to the inlet, said first compressor assembly comprising a first turbine and a first compressor being powered by the first turbine, said first turbine being coupled to said exhaust outlet with said first turbine being driven by exhaust gas from the engine;

a hydraulic power system comprising a hydraulic pump and a hydraulic reservoir;

a second compressor assembly for recirculating exhaust gas from the engine exhaust outlet to the air inlet, said second compressor assembly comprising a second turbine and a second compressor being powered by the second turbine, with said second turbine being driven by said hydraulic power system.

13. An exhaust gas recirculation system according to claim 12, wherein the hydraulic system is a power steering system.

14. An exhaust gas recirculation system according to claim 12, wherein the hydraulic system utilizes oil from a fuel injection system.

15. An exhaust gas recirculation system according to claim 12, further comprising a mixer for combining the air from the first compressor and the exhaust from the second compressor.

16. An exhaust gas recirculation system according to claim 12, further comprising means for controlling the flow of exhaust to the second compressor.

17. An exhaust gas recirculation system according to claim 12, further comprising means for regulating the flow of exhaust into the inlet.

18. An exhaust gas recirculation system according to claim 17, wherein the means for regulating the flow of exhaust into the inlet includes the hydraulic system.

19. An exhaust gas recirculation system according to claim 18, wherein the flow of exhaust into the inlet is regulated by the flow of hydraulic fluid through the hydraulic system.

20. An exhaust gas recirculation system according to claim 12, further comprising a cooler for cooling the air from the first compressor before it enters the inlet and a cooler for cooling the exhaust before it enters the second compressor.

* * * * *